Figure 2:
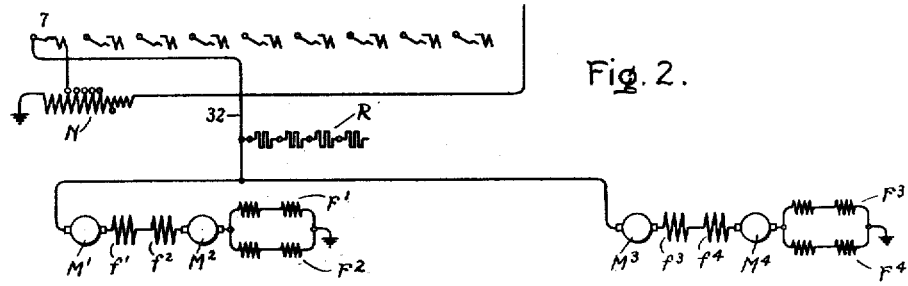

G. H. HILL.
SYSTEM OF CONTROL.
APPLICATION FILED MAR. 23, 1907.

No. 904,780. Patented Nov. 24, 1908.
3 SHEETS—SHEET 1.

Fig. 1.

Witnesses
George H. Tilden
J. Ellis Glen

Inventor
George H. Hill,
by Albert G. Davis
Atty.

G. H. HILL.
SYSTEM OF CONTROL.
APPLICATION FILED MAR. 23, 1907.

904,780.

Patented Nov. 24, 1908.
3 SHEETS—SHEET 2.

Witnesses:
George W. Tilden
J. Ellen Ellen.

Inventor:
George H. Hill,
by Albert... Att'y.

G. H. HILL.
SYSTEM OF CONTROL.
APPLICATION FILED MAR. 23, 1907.
904,780.
Patented Nov. 24, 1908.
3 SHEETS—SHEET 3.
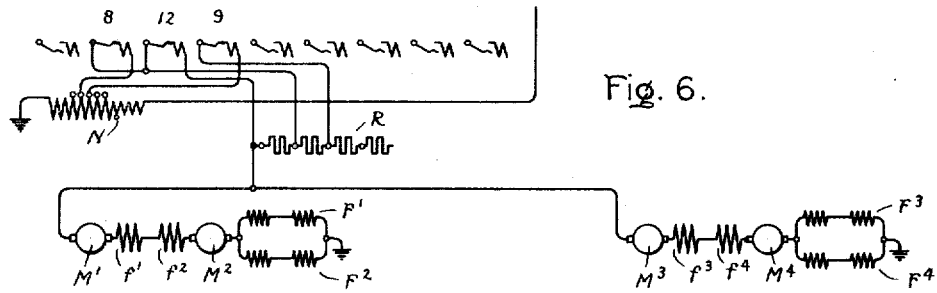
Fig. 6.
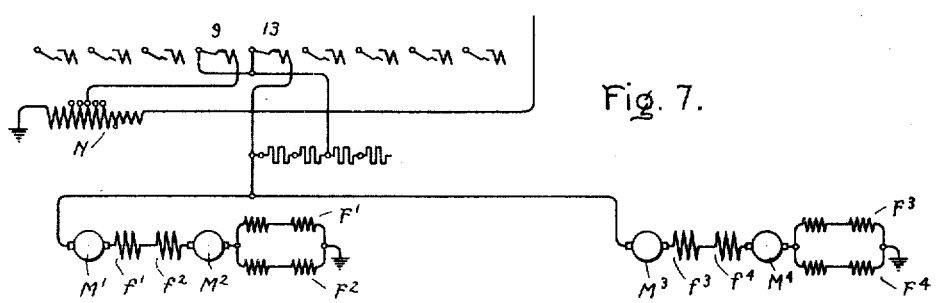
Fig. 7.
Fig. 8.
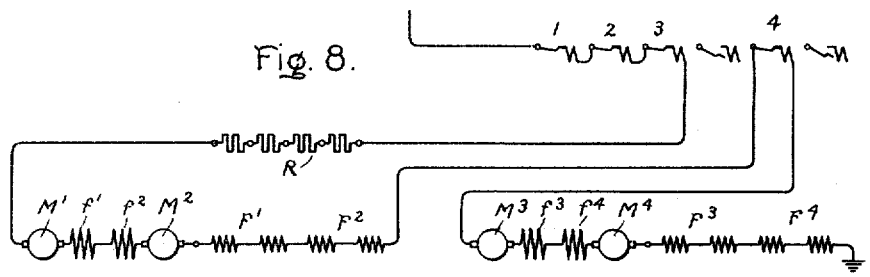
Fig. 9.
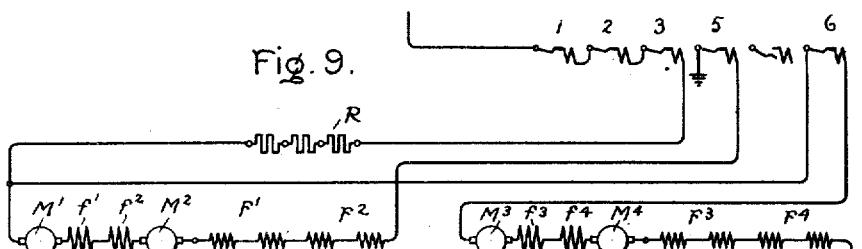
Fig. 10.
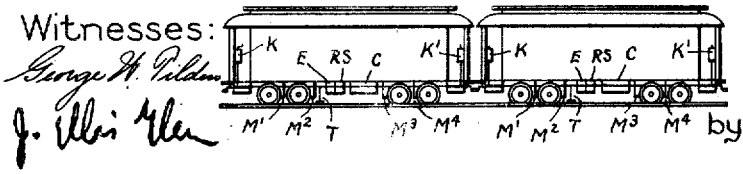
Witnesses:
Inventor:
George H. Hill,
by
Att'y.

UNITED STATES PATENT OFFICE.

GEORGE H. HILL, OF SCHENECTADY, NEW YORK, ASSIGNOR TO GENERAL ELECTRIC COMPANY, A CORPORATION OF NEW YORK.

SYSTEM OF CONTROL.

No. 904,780.  Specification of Letters Patent.  Patented Nov. 24, 1908.

Application filed March 23, 1907. Serial No. 364,061.

*To all whom it may concern:*

Be it known that I, GEORGE H. HILL, a citizen of the United States, residing at Schenectady, in the county of Schenectady and State of New York, have invented certain new and useful Improvements in Systems of Control, of which the following is a specification.

My invention relates to the control of electrical translating devices which are adapted to operate on both alternating and direct currents and has for its object to improve the same.

The invention is particularly applicable to electric railways so equipped that the cars or train of cars operate on low potential direct current within city limits and on high potential alternating current throughout less thickly populated territory. In such a system it is necessary to provide step-down transformers on the cars or locomotives in order to reduce the potential of the alternating current to about the potential at which direct current is supplied. It is also the practice to provide some means for changing the relative connections of the motor windings when passing from an alternating current to a direct current section, or vice versa; for example, the field windings of series motors or group of series motors are usually divided into two portions which are connected in parallel with each other for operation on alternating current and in series with each other during direct current operation. For these reasons—and also for the reason that when operating on direct current the most convenient way of controlling the current is by means of resistance, while on alternating current speed control can most conveniently be obtained by changing the point of connection between the motor and the current transformer,—a large number of switch-mechanisms or circuit controlling devices are necessary for making the various connections.

Specifically considered, the present invention consists of a multiple unit control system so arranged that a plurality of controllers of the separately-actuated contact type may be governed from any one of a number of master controllers so as to connect a motor or motors either to a source of alternating current or to a source of direct current; to regulate the speed, when operating on direct current, by varying the resistance in the motor-circuit; and to regulate the speed, when operating on alternating current, by varying the point of connection to a transformer. The circuits are so arranged that the resistance and the resistance controlling contacts are made to serve the additional function of operating, during alternating current operation, to prevent open-circuiting or short-circuiting of the transformer during the shifting of the connection from one tap to another.

In one of its aspects my invention may therefore be regarded as comprising a novel alternating current and direct-current system of control wherein the parts are so organized and interrelated that a large number of control steps may be obtained, both for alternating current operation and for direct current operation, by means of a minimum number of switch mechanisms.

In a further aspect my invention may be regarded as a novel system of multiple unit control wherein a plurality of independent units are connected and controlled from a single master controller for operation on either alternating or direct current.

In a further aspect my invention may be regarded as a combined alternating current and direct current control system for a translating device, wherein the resistance used for governing the translating device when operating on direct current is employed in making changes from one tap to another on a transformer during operation on alternating current.

In a still further aspect my invention may be considered as comprising a novel control system of the separately-actuated contact type wherein a portion of the contacts are used both for controlling the resistance on direct current operation and for effecting the changes in connection between the motors and the transformer during operation on alternating currents.

The various features of novelty characterizing my invention will be pointed out with particularity in the appended claims, but for a full understanding of my invention in its various aspects reference may be had to the following detailed description taken in connection with the accompanying drawing, wherein Figure 1 is a diagrammatic representation of a motor and control equipment for one car, the arrangement being such that a single car may be operated or a plurality of cars may be connected together and controlled in unison from the same master controller; Figs. 2 to 9 inclusive, are diagrams showing the manner in which the speed of the motors is controlled when operating on alternating current and when operating on direct current; and Fig. 10 shows a train of two cars equipped in accordance with my invention.

In the drawing I have shown a four-motor railway car equipment; but it will of course be understood that my invention is not limited to this particular arrangement but is applicable to any number of motors or other translating devices intended for other purposes than the propulsion of railway vehicles.

Referring to the drawings, $M'$ to $M^4$ represent two pairs of series motors such as are usually employed where it is intended that they shall operate both on alternating and direct current. In addition to the compensating windings, $f'$ to $f^4$, these motors have main field windings $F'$ to $F^4$.

RS is a magnetically-actuated reversing switch of any usual type adapted to alter the relative connections between the armature and main field windings so as to reverse the direction of rotation of the motors.

E is an electromagnetically-actuated commutating switch which is so arranged that in one position it connects the main field windings of each pair of motors in series with each other, while in its other position it connects these windings in parallel.

L is a trolley wire or other source of current supply and T is a current collector adapted to engage with the trolley wire and carry current to the motors.

S and S' are main switches, the switch S being adapted to close automatically when alternating current is being supplied and the switch S' when the current is direct.

N is a stepdown transformer, preferably an auto transformer or compensator, adapted to be connected to trolley by the switch S.

R is a resistance made up of any desired number of sections.

C is a controller of the separately-actuated contact type arranged to connect the motors either to variable points on the transformer, or to connect them directly to trolley in series with variable portions of resistance. In addition, the controller is arranged to connect the motors either in series or in series-parallel when operating on direct current.

K and K' are master-controllers arranged one at each end of the car.

O is a master-reversing switch, and P a main switch in the circuit leading to the master-controller. In the diagrammatic representation of the master-controller, the reversing switch and the commutating switch, the small circles indicate stationary contact fingers, while the rectangular segments indicate similarly-shaped contact-pieces arranged on the surface of a movable cylinder.

Q is a group of train wires to which the master controllers are connected in parallel. By means of these train wires the motors on a plurality of cars may be controlled simultaneously from any one master controller.

The motor controller consists of a plurality of line switches, 1, 2 and 3, for connecting the motors to trolley, a series switch 4, and two parallel switches 5 and 6. These switches come into play only when the motors are operating on direct currents. Switches 7 to 11, inclusive, serve to connect the motors to different taps on the transformer, these switches being used only when operating on alternating current. Switches 12 to 15, inclusive, when the motors are operating on direct current, control the amount of resistance in circuit with the motors; while during operation on alternating current these switches coöperate with the switches 7 to 11 to make the changes in the connections to the transformer.

U is a relay which controls the circuits of the switches 7 to 11. This relay is arranged to be energized only on alternating current, and therefore the switches 7 to 11 are cut out during direct current operation.

The arrangements of the various circuits can best be described in connection with the mode of operation of the system. In the drawing, all the parts are shown in the out-of-running positions the commutating switch E being shown in its direct current operating position and the reversing switch in its forward running position. Assume that the car illustrated is on a direct current section; then upon bringing the collector-shoe into engagement with the trolley wire, current flows through the primary of the small transformer $n$, through the actuating coil $s'$ in the switch S', to ground. The switch S' closes and completes the connection between the trolley and the line switches 1, 2 and 3. Thereupon current flows through wire 16, through the actuating coil $e$ of the commutating switch, through wire 18, through wire 19, to ground. The actuating coil of the commutating switch is therefore energized and the switch is thrown so as to make the proper connections for operating the motors on direct current, unless it happens that, as illustrated, the commutating switch is already in this position. The chief function of the commutating switch indicated is to connect the main field windings of each group of motors in parallel for alternating current operation and in series for direct current operation. Therefore, in the position of the commutating switch illustrated, the field windings of each group are connected in series with each other. It will be seen that the movable contact 20 of the commutating switch is now in engagement with two of the fixed contacts and completes a circuit from the wire 16 to wire 21, and thence to wire 22, which is connected to both of the master controllers. The current for operating the several switches of the controller is received through this circuit.

If it be now desired to start the car the switch P is closed, the reversing switch is operated, and the master-controller is brought into its first operative position. Current flows from the current collector, through the circuit previously traced to wire 22 and thence through the blow-out coil B O and switch P to contact 23 of the master-controller. From this point (assuming that the movable member $o$ of the master reverser has been moved to the right) current flows through the movable contacts of the controller, contact 24, thence through the master reversing switch to train wire $q^3$, and from this train wire current flows through wire 25, and thence through the actuating coil $r$ of the reversing switch; and, if the reversing switch is not in the desired position, through the stationary contacts and connected movable contacts 26 and 27 of the reversing switch, through the auxiliary contact $1^a$ connected with the main line switch 1, to ground. This causes the reversing switch to be brought into the position shown, and the circuit is interrupted at contacts 26 and 27 on the reversing switch; but a second circuit is completed by movable contacts 28 on the reversing switch and the coöperating fixed contacts so that the current now flows through the actuating coil of the reversing switch, through contact 28 of the reversing switch, through wire 29, and thence through the actuating coils of switches 1, 2, 3 and 4, through the auxiliary switch $6^a$ associated with main switch 6, to train-wire $q^2$, through the fixed contacts 30 and 31 and the coöperating movable contacts of the master controller, to ground.

The circuits heretofore traced are all control circuits, but now a main circuit may be traced from trolley, through the switch S′, through line switches 1, 2 and 3, through resistance R, through conductor 32, through the armatures and compensating field windings $f'$ and $f^2$ of the motors M′ and M², through the reversing switch, through the main field windings F′, through the commutating switch, through the main field windings F², through reverser contacts, through conductor 33, thence through switch 4, through the armatures and compensating field windings $f^3$ and $f^4$ of the motors M³ and M⁴, through reverser contacts through the field windings F³, through the commutating switch, and thence through the field windings F⁴ and reversing switch, to ground. The motors, with the armature and field coils of each arranged in series, are now connected in series with each other and in series with all of the resistance, as shown diagrammatically in Fig. 8.

As the master controller is turned toward the right, contacts 34 to 37, inclusive, on the controller, engage successively with the coöperating stationary contacts, and current is caused to flow to train-wires $q^4$, $q^5$, $q^6$ and $q^7$ in succession. This causes switches 12, 13, 14 and 15 to be closed, one after the other and, since each of these switches controls a section of the resistance, the resistance is cut out step-by-step until, when the switch 15 is closed, all of this resistance has been eliminated. It will be noted that the circuit which includes the actuating coil of switch 12 passes from train wire $q^4$, through wire 38, thence through the auxiliary switch $7^a$, associated with switch 7; whereby the switch 12 is prevented from closing unless the switch 7 is open. In the same way, the auxiliary switch $8^a$, associated with switch 8, controls the actuating circuit of switch 13; and the auxiliary switches $9^a$ and $10^a$ control the actuating circuits of switches 14 and 15. The purpose of this system of interlocks will be hereinafter explained. In turning the master controller from the fifth to the sixth position, all of the circuits are interrupted, so that all of the controller switches open. In the sixth position of the master controller, train wire $q'$, instead of train wire $q^2$ as before, is connected to ground through the controller contact 31, and therefore the circuit for the series switch 4 is broken and the circuit which includes the actuating coils of the line switches 1 to 3, continues through the actuating coils of the parallel switches 6 and 5, through the auxiliary switch $4^a$, associated with the series switch 4, to train wire $q'$, and thence through the controller, to ground. The motors, with the armature and field coils of each arranged in series, are now connected in parallel to the line with all of the resistance, except the first section, in series therewith; the first section of the resistance being cut out in the first parallel position through the energization of the actuating coil of switch 12, when the movable contact 39 on the master controller engages with the coöperating fixed contact which is in electrical connection with train-wire $q^4$. This is the condition indicated in Fig. 9. Upon turning the master controller through its remaining operative positions, the remainder of the resistance R is removed and the motors, with the armature and field coils of each arranged in series, are left connected in parallel with no extraneous resistance in circuit.

In order to cause the car or train to move in the opposite direction, the master reversing switch is thrown toward the left, instead of toward the right, and then, except that the coil r' of the reversing switch is energized and the motors reversely connected, the rest of the operations just described take place as before in speeding up the motors from first series with all resistance in circuit to full parallel with no resistance in circuit.

Upon entering an alternating current section, the current through the coil of the main switch s' is cut down to such an extent by the action of transformer n that this switch remains open; but the switch S, whose actuating coil s is connected to the secondary of the small transformer, is caused to be closed, thereby connecting the main transformer to trolley. The commutating switch is now automatically thrown to the opposite position from that shown, so that the motors are automatically connected up for proper operation on alternating current, namely, with the main field windings of each group of two motors in parallel with each other. The operation of the commutating switch to the alternating current running position may conveniently be effected by connecting one terminal of the actuating coil e' to ground and the other terminal to a tap on the compensator through a wire 40. When the commutating switch is in its alternating current position, the movable contact 41 connects wires 40 and 21 together in the same manner that contact 20 connects together wires 16 and 21 when the commutating switch is in its direct current position, so that the current for energizing the switches of the main controller is now received from the compensator instead of directly from trolley, as before.

When it is desired to start the car, the master reversing switch is moved in one direction or the other as may be desired and the master controller is operated in exactly the same manner as when direct current is being supplied.

The switches 1 to 6 remain idle during alternating current operation and, to prevent them from being closed, one terminal of each of the actuating coils r and r' is grounded through contacts 42 to 46 on the commutating switch. Thus the current, after traversing the actuating coils of the reversing switch, flows directly to ground instead of through the actuating coils of switches 1 to 6.

A branch 47 extends from the wire 40 to each of the master controllers, through which, by means of coöperating contacts 48 to 51, a circuit is completed to train-wire $q^{10}$. Current flows from train-wire $q^{10}$, through the actuating coil of relay U, through wire 52, and thence through contacts on the commutating switch, to ground. The contacts 50 and 51 on the master controller are of such length that the circuit through the actuating coil of the relay remains complete in all running positions of the controller so that while the motors are operating on alternating current the relay U remains energized and has its movable contacts held in engagement with the fixed contacts. It will be noted that the relay is of a peculiar construction, namely, all of its movable contact members are electrically connected together and, since one of the fixed contacts is grounded, all of the wires which lead to the contacts of the relay are grounded when the relay is energized.

In the first running position of the master controller, train-wire $q^3$ is energized by reason of the engagement of controller contacts 53 and 54, and current flows through the actuating coil of switch 7, thence through the contacts of the relay, to ground. Switch 7 is therefore energized and closed, and wire 32, which leads to the motors, is connected to the lowest tap on the compensator. The conditions of the circuit are now as indicated in Fig. 2, namely, the motors are connected in parallel to the lowest tap on the transformer, and the main field windings of each group of motors are also arranged in parallel with each other. To effect increase in speed, the point of connection of the wire 32 to compensator is changed so as to increase the voltage across the terminals of the motor. It is of course not desirable to open the motor circuit in changing from one speed to the other and therefore some means must be provided for preventing short circuit on the compensator during the time when connection is maintained at two different taps. To this end I make use of the main resistance and the resistance-controlling switches so that before the circuit is broken at one tap on the compensator a resistance is connected between that tap and the next succeeding tap, whereby the motors are connected directly to one of the taps, and to the other through a resistance. The parts are so arranged that the low-voltage connection is then interrupted and the resistance cut out, leaving the motors connected directly to the compensator, but at a point of higher voltage than before.

Figure 5:
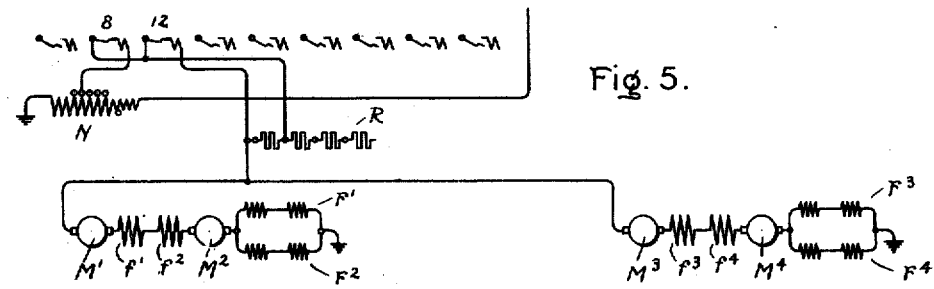

Fig. 2 shows the connections when the controller is in its first running position, and Fig. 5 the connections when the controller is in its second running position.

Figure 3:
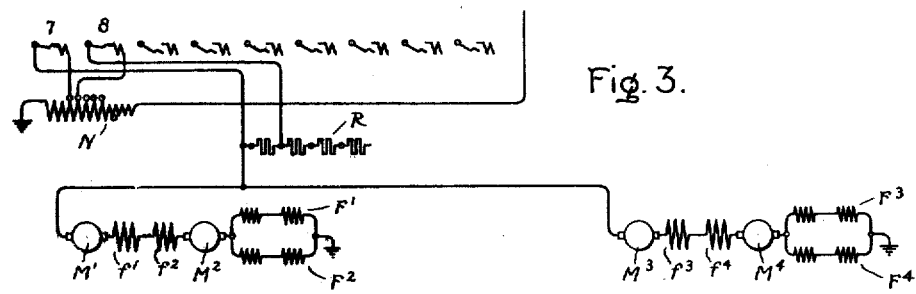
Figure 4:
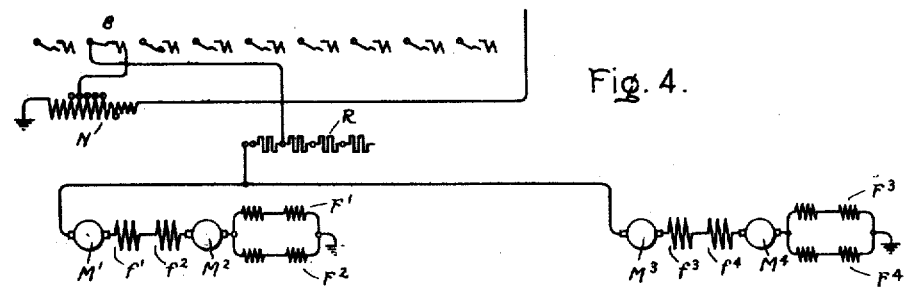

Figs. 3 and 4 show the transition steps which are made while the controller is moving from the first to the second position. It will be seen that the contacts on the master controller are so arranged that in moving the controller from the first position to the second position, train-wire $q^4$ is energized before train wire $q^3$ is deënergized; thus switch 8 is closed before switch 7 is opened. Consequently, for an instant, the circuits leading from the transformer are as indicated in Fig. 3, namely, the motors are connected directly to the left-hand tap on the commutator through switch 7 and through the second tap on the left through switch 8 and a section of resistance R. When the contact 53 on the master-controller has moved fully out of engagement with coöperating contact 54, train wire $q^3$ is deenergized and switch 7 opens. The connections are now as shown in Fig. 4 and the motors are connected to the second tap on the transformer through a section of resistance. As soon as the switch 7 opens, it closes its auxiliary switch $7^a$ and current passes from the train wire $q^4$ through this auxiliary switch, and thence through the actuating coil of switch 12, so that switch 12 closes and short-circuits the section of resistance, as indicated in Fig. 5. Thus the motors are connected directly to the second tap on the transformer without the intervention of any extraneous resistance. In the same way in moving from second to third position of the controller train-wire $q^5$ is energized before the train-wire $q^4$ is deenergized, and therefore switch 9 closes before switches 8 and 12 open. This is the condition indicated in Fig. 6. Thereafter, switches 8 and 12 open, leaving the motors connected to the third tap of the transformer in series with two sections of resistance. When this occurs the actuating circuit for switch 13 is completed through the auxiliary switch $8^a$, and switch 13 closes and short-circuits the resistance. The condition is now that shown in Fig. 7, namely, the motors are connected directly to the third tap on the transformer. In this same way in moving to the fourth running position, the switch 10 is closed, and switches 9 and 13 open and then the switch 14 is closed. In moving the controller from the fourth to the fifth position, the switch 11 closes before the switches 10 and 14 open, then the switches 10 and 14 open and the switch 15 closes. It will thus be seen that the voltage across the terminals of the motors is gradually increased without opening the motor circuit and without in any way endangering the transformer. Furthermore, this is effected without the use of any switches or devices which are not useful when operating on direct current, except the several switches 7 to 11, inclusive, which are connected directly to the taps of the transformer. By thus using the main resistance and a group of switches both for alternating current operation and direction current operation, the amount of apparatus required is reduced to a minimum without interfering in any way with the proper operation of the system on either current.

I have also shown at $M^5$ a motor such as an air-pump motor, together with a relay W, which is energized on direct current, by reason of being connected to wire 16 so as to change the connections of the motor windings passing from one section to another. It will be seen that when the relay W is energized, current flows from trolley through wire 16, wire 60, and through the armature and field windings in series with each other. When operating on alternating current, the relay being deënergized, current flows from one of the taps on the compensator through wire 61 and thence through the armature of the motor $M^5$ and the two field windings 62 and 63 connected in parallel. This feature forms no part of the present invention but illustrates a convenient manner in which the auxiliary motors such as pump motors and the like may be controlled so as to operate satisfactorily on either current.

The switches or contacts 7—15 which operate on both direct and alternating current may be of any suitable design and may conveniently take the form disclosed in my application Serial No. 294,503, filed January 4, 1906; but the switches or contacts 1 to 6, being intended to operate only on direct current, may be of any of the well known types now in use in direct current control systems.

While I have described in detail my invention as embodied in a single preferred form, I do not desire to be limited to the particular form illustrated or described, since in its broader aspects my invention may take various other forms; and furthermore many of the features of invention, while coöperating advantageously to produce an efficient system as a whole, may yet be used independently of each other, since they contain useful and novel elements of construction and organization and have novel functions which are applicable to situations apart from those wherein all of the features are combined into a single whole.

What I claim as new and desire to secure by Letters Patent of the United States, is,

1. In a system of control, a translating device, a main controller having separate alternating-current and direct-current governing means for said device, and a master controller for said main controller.

2. In a system of control, a translating device, a controlling-device for alternating-current operation, a controlling-device for direct-current operation, and a master controller for governing both of said controlling devices.

3. In a system of control, a motor, a motor-controlling device for alternating-current operation, a motor-controlling device for direct-current operation, and a master controller for governing the action of both of said controlling devices.

4. In a system of control, a motor, a speed-controlling device for use on alternating-current, a second speed controlling device for use on direct-current, switch-devices for governing said controlling devices, and a master controller for governing said switch devices.

5. In a system of control, a translating device, a transformer, a resistance, switch devices for connecting said translating device to the transformer for alternating current operation, switch devices for connecting the translating device to a source of supply with said resistance in circuit for operating on direct currents, and a master-controller for governing the operation of the said switch-devices.

6. In a system of control, a translating device, a transformer, a resistance, switch-devices for connecting said translating device to variable points on the transformer for operation on alternating current, switch devices for connecting said translating device to a source of current with variable portions of said resistance in circuit for operation on direct current, and a master controller for governing said switch devices.

7. In a system of motor control, a motor, a transformer, a resistance, a motor controller of the separately-actuated contact type having contacts for connecting the motor to variable taps on the transformer and other contacts for connecting the motor to a source of supply with variable portions of the resistance in circuit, and a master-controller for governing the action of all of said contacts.

8. In a control system, a controller of the separately-actuated contact type having a set of alternating current contacts and a set of direct current contacts, a master controller, and means for causing said master controller to operate selectively on said sets of contacts so as to cause a contact in one set or the other to be actuated when the master controller is in a given position, according as the current is alternating or direct.

9. In a train-control system, a plurality of motor controllers each having alternating-current and direct-current contacts, a master controller, and a single set of train wires connecting said master-controller to all of said motor controllers.

10. In a system of control, a translating device, a transformer, a resistance, and a controller arranged to connect said translating device to variable points on the transformer when operating on alternating-current and to a source of current with variable portions of said resistance in circuit for operation on direct-current, said controller including means for connecting portions of said resistance in a branch circuit between the translating device and one tap on the transformer before connection is broken between the translating device and another tap on the transformer.

11. In a system of control, a translating device, a controller having contacts for governing the operation of said translating device on alternating current and other contacts for governing the operation of said translating device on direct current, electromagnetic actuating means for said contacts, a commutating switch for varying the circuit connections for said translating device, and means associated with said commutating switch for controlling the circuits of said actuating means to cause said contacts to be selectively actuated according as the current which is being supplied is direct or alternating.

12. In a system of control, a motor, a motor controller having contacts for controlling the operation of said motor on alternating current and other contacts for controlling the operation of the motor on direct current, electromagnetic actuating means for said contacts, a relay for controlling the circuits of the actuating means for one set of contacts, a commutating switch arranged to vary the relative connections of the motor windings, and contacts on said commutating switch for controlling said relay.

13. In a system of control, a motor, a motor controller having a plurality of contacts arranged to control the operation of the motor on alternating current and other contacts for controlling the operation of the motor on direct current, a reversing switch, actuating means for said contacts and for said reversing switch, control circuits for the actuating means for the reversing switch arranged to energize also the actuating means for one of said sets of contacts, a commutating switch for changing the relative connections of the motor windings, and contacts on said commutating switch for completing the circuit through the reverser actuating means independently of the actuating means of said latter set of contacts.

14. In a system of control, a plurality of groups of series motors, and a combined alternating and direct current controller arranged to connect the groups of motors in parallel with each other with the field windings of one motor in each group connected in parallel with the field windings of the other motor in that group for operation on alternating current and for connecting the groups of motors first in series and then in parallel for operation on direct current, the armature and field windings of each group being arranged in series during operation on direct current.

15. In a system of control, a motor, a plurality of contacts for controlling the operation of the motor on direct current, a plurality of contacts arranged to operate only on alternating current, actuating means for said contacts, a master controller, and a single set of connections between the master controller and the actuating means for said contacts.

16. In a system of control, a motor, a set of contacts arranged to be actuated for controlling the operation of the motor only on alternating current, a second set of contacts arranged to be actuated to control the operation of the motor on direct current, a master controller, a single set of connections from the master controller to the actuating means for both sets of contacts, and means associated with the set of alternating current contacts for automatically causing the operation of the other set of contacts.

17. In a system of control, a motor, a set of contacts for controlling the operation of the motor on alternating current, a second set of contacts for controlling the operation of the motor on direct current, actuating means for said contacts, a master controller, a single set of connections from said master controller to the actuating means of both contacts, a relay for governing the circuits of the actuating means for one set of contacts, and means controlled by the latter contacts for controlling the actuating circuits for the other contacts.

18. In a system of control, a motor, a group of contacts arranged to control the operation of the motor on alternating current, a similar group of contacts arranged to control the operation of the motor on direct current, a master controller, and connections between the master controller and the actuating means for said contacts so arranged that the operation of the master controller causes the contacts of one group or the other to be actuated according as the current supply is alternating or direct, and means associated with one of said groups of contacts to cause the automatic actuation of the contacts of the other group.

19. In a system of control, a plurality of motors, a resistance, a transformer, a group of contacts arranged to connect the motors to different points on the transformer in two groups arranged in parallel for operation on alternating current and to a source of current supply in series and then in series parallel with different amounts of said resistance in circuit for operation on direct current.

20. In a system of control, a translating device, a transformer, a resistance, switches arranged to connect said translating device to different taps on the transformer, a resistance controlling switch, a master controller and connections so arranged that upon the operation of the master controller from one position to the next the translating device is first connected to one tap on the transformer and then to a second tap through said resistance and the connection to the first tap is then interrupted and the resistance cut out.

21. In a system of control, a motor, a transformer, a resistance, a series of switches for connecting the motor to different points on the transformer for operation on alternating current, a second series of switches for varying the amount of said resistance in the motor circuit when operating on direct current, a master controller, and connections so arranged that upon the operation of the master controller from one running position to another the motor is first connected to one tap on the transformer, a resistance controlling switch is operated to connect the motor to a second tap on the transformer through a portion of the resistance and finally the connection to the first tap is interrupted and the resistance eliminated from the motor circuit.

In witness whereof, I have hereunto set my hand this 21st day of March, 1907.

GEORGE H. HILL.

Witnesses:
BENJAMIN B. HULL.
HELEN ORFORD.